(12) United States Patent
Nadalin et al.

(10) Patent No.: US 7,451,484 B1
(45) Date of Patent: Nov. 11, 2008

(54) METHOD FOR ENABLING A PROGRAM WRITTEN IN UNTRUSTED CODE TO INTERACT WITH A SECURITY SUBSYSTEM OF A HOSTING OPERATING SYSTEM

(75) Inventors: Anthony J. Nadalin, Austin, TX (US); Bruce Arland Rich, Round Rock, TX (US); Theodore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,788

(22) Filed: May 27, 1999

(51) Int. Cl.
G06F 12/14 (2006.01)
(52) U.S. Cl. ........................................ 726/19
(58) Field of Classification Search ................ 713/200; 709/316, 315, 330; 726/19
See application file for complete search history.

(56) References Cited

U.S. PATENT DOCUMENTS

| | | | |
|---|---|---|---|
| 5,187,790 A * | 2/1993 | East et al. ................ 709/316 |
| 5,421,011 A | 5/1995 | Camillone et al. | |
| 5,623,601 A | 4/1997 | Vu | |
| 5,678,041 A | 10/1997 | Baker et al. | |
| 5,682,478 A | 10/1997 | Watson et al. | |
| 5,684,951 A | 11/1997 | Goldman et al. | |
| 5,689,708 A * | 11/1997 | Regnier et al. ............ 709/229 |
| 5,708,780 A | 1/1998 | Levergood et al. | |
| 5,802,367 A * | 9/1998 | Held et al. ................ 709/332 |
| 5,974,566 A * | 10/1999 | Ault et al. ................ 714/15 |
| 6,157,961 A * | 12/2000 | Kessler et al. ............ 709/315 |
| 6,182,142 B1 * | 1/2001 | Win et al. ................ 709/229 |
| 6,275,938 B1 * | 8/2001 | Bond et al. ................ 713/200 |
| 6,298,370 B1 * | 10/2001 | Tang et al. ................ 709/102 |
| 6,308,225 B1 * | 10/2001 | Schofield ................ 709/316 |
| 6,453,362 B1 * | 9/2002 | Bittinger et al. ............ 709/316 |
| 6,529,962 B1 * | 3/2003 | Azagury et al. ............ 709/330 |
| 6,553,428 B1 * | 4/2003 | Ruehle et al. ............ 709/330 |

FOREIGN PATENT DOCUMENTS

WO 9714098 4/1997

OTHER PUBLICATIONS

Frisch, AEleen; Essential System Administration; 1995; O'reilly; 2nd Edition, pp. 23-66, 144-197, 273-278, 585-597.*

(Continued)

*Primary Examiner*—Jung Kim
(74) *Attorney, Agent, or Firm*—Stephen J. Walder, Jr.; Jeffrey S. LaBaw

(57) ABSTRACT

A program written in untrusted code (e.g., JAVA) is enabled to access a native operating system resource (e.g., supported in WINDOWS NT) through a staged login protocol. In operation, a trusted login service listens, e.g., on a named pipe, for requests for login credentials. In response to a login request, the trusted login service requests a native operating system identifier. The native operating system identifier is then sent to the program. Using this identifier, a credential object is then created within an authentication framework. The credential object is then used to login to the native operating system to enable the program to access the resource. This technique enables a JAVA program to access a WINDOWS NT operating system resource under the identity of the user running the JAVA program.

18 Claims, 3 Drawing Sheets

OTHER PUBLICATIONS

Itoi, Naomaru; Honeyman, Peter; "Pluggable Authentication Module for Windows NT"; Apr. 10, 1998; CITI Technical Report 98-1; pp. 1-4.*

Horstmann, Cay S.; Cornell, Gary; Core JAVA vol. I-Fundamentals; 1997; Sun Microsystems Press, pp. 21-78.*

Stallings, William; Cryptography and Network Security; Jun. 4, 1998; Prentice-Hall, Inc.; pp. 323-353.*

Author unknown; 'Moving Unix Applications to Windows NT'; Feb. 16, 1994; http://praun.home.cern.ch/praun/public/UNIX-to-NT/overview.html; pp. 1-52.*

Hunt, Craig; 'TCP/IP Network Administration'; Mar. 1993; O'Reilly & Associates; pp. 27-50.*

* cited by examiner

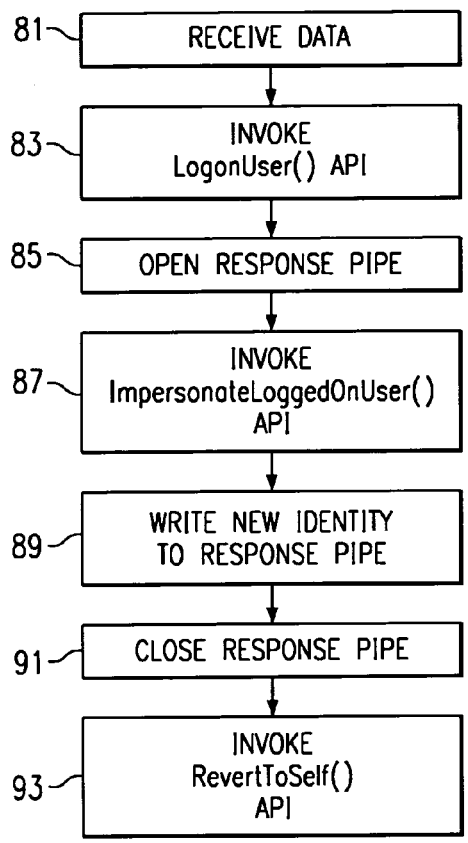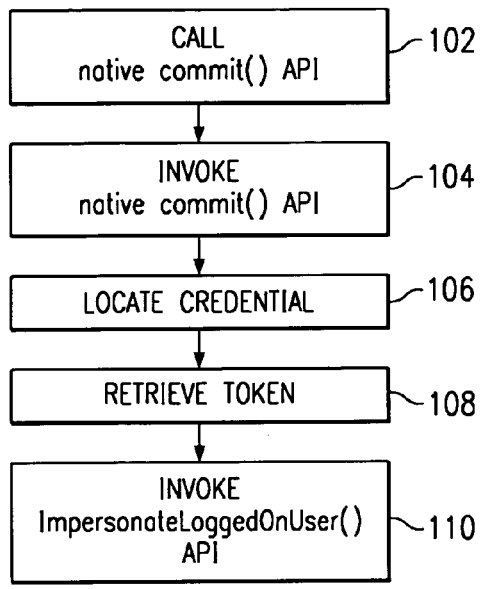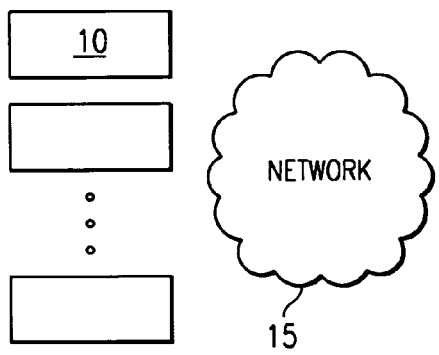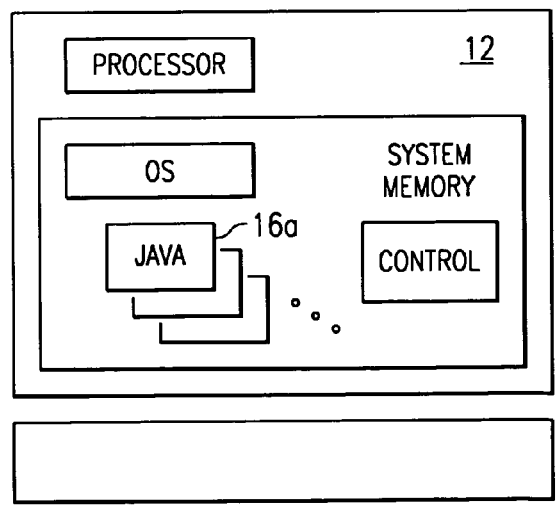

METHOD FOR ENABLING A PROGRAM WRITTEN IN UNTRUSTED CODE TO INTERACT WITH A SECURITY SUBSYSTEM OF A HOSTING OPERATING SYSTEM

TECHNICAL FIELD

The present invention relates generally to enabling a program written in untrusted code (e.g., JAVA) to access a resource managed by a closed operating system (e.g., WINDOWS NT).

DESCRIPTION OF THE RELATED ART

JAVA, originally developed by Sun Microsystems™, is an object-oriented, multi-threaded, portable, platform-independent, secure programming environment used to develop, test and maintain software programs. JAVA programs have found extensive use on the World Wide Web, which is the Internet's multimedia information retrieval system. These programs include full-featured interactive, standalone applications, as well as smaller programs, known as applets, that run in a JAVA-enabled Web browser or applet viewer.

Initially, programs written in JAVA found widespread use in Internet applications. As a result of this browser-centric focus, security concerns raised by JAVA primarily involved the security of the JAVA sandbox and the origin of the executable code (namely, the class). More recently, JAVA is beginning to move out of the browser and into server backend environments. With this change, it becomes necessary to consider security concerns associated with more traditional environments, e.g., identifying the user of the JAVA program and what privileges should be granted to that user. To this end, it has been proposed to define a JAVA Authentication Service framework as a standard extension on top of the JAVA Development Kit (JDK) 1.2.

JAVA's early acceptance was driven largely by the Web and desire for active content on Web servers, but its continuing incorporation into information technology infrastructures has been somewhat limited by JAVA's lack of integration with underlying operating system services. Meanwhile, on a parallel track, the WINDOWS NT operating system, with its support from fairly sophisticated security mechanisms (for a commodity operating system) has been increasingly used as the base for new applications.

Given the nature of the NT security mechanisms, it has not been possible to allow JAVA programs to access NT operating system resources. Because of the "closed" nature of WINDOWS NT, a user of a client machine may only log on against an account held at the machine, at a server running the WINDOWS NT operating system, or at any other servers that are "trusted" by the NT server that the client is configured against. Only these options are supplied to the user during the logon process, and there are no practical interfaces to allow user authentication from non-native server domains. This closed architecture, together with the JAVA security paradigm, makes it difficult to interface a JAVA program to a WINDOWS NT resource.

In particular, WINDOWS NT does not allow normal programs to run under an identity other than the one in which they started. Once a user logs in, all programs inherit that original identity. Specifically, WINDOWS NT enforces this prohibition by requiring that callers of the LogonUser API, which results in a new access token, must be running with a given privilege, and this privilege is only available to the most trusted of users. It would be desirable to provide a bridge between ease of programming with JAVA and the rich security model afforded by NT.

The present invention solves this problem.

BRIEF SUMMARY OF THE INVENTION

It is an object of the present invention to allow a JAVA program to access NT operating system resources under the identity of the user running the JAVA program.

A more specific object of this invention is to facilitate WINDOWS NT login from an JAVA-based authentication service.

Still another object of the invention is to allow application servers running JAVA programs to run each program as a separate thread and have each thread run as a different NT user.

Another more specific object of the invention is to provide a mechanism that binds a particular WINDOWS NT identity to a particular thread executing in a JAVA Virtual Machine (JVM).

Another object of the invention is to enable JAVA programs to take advantage of the rich security model available from the NT operating system platform.

A more general object of the present invention is to enable a program written in untrusted code to login to and access a resource within a closed operating system environment.

Yet another general object of this invention is to provide a mechanism that enables an enterprise to leverage its investments both in JAVA and in NT security protections.

According to the invention, a program written in untrusted code (i.e. code that is not part of a trusted computing base) is enabled to access a native operating system resource through a staged login protocol. In operation, a trusted login service listens, e.g., on a named pipe, for requests for login credentials. In response to a login request, the trusted login service requests a native operating system identifier. The native operating system identifier is then sent to the program. Using this identifier, a credential object is then created within an authentication framework. The credential object is then used to login to the native operating system to thereby enable the program to access the resource.

The technique enables the program written in untrusted code (e.g., JAVA) to access the operating system resource (e.g., supported in WINDOWS NT) under the identity of the user running the program.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a flowchart illustrating the process steps of a service thread executing in the trusted code service routine;

FIG. 4 is a flowchart illustrating the process steps of the commit routine of the JAVA authentication service; and FIG. 5 illustrates a conventional client-server operating environment in which the present invention is implemented.

DETAILED DESCRIPTION OF THE PREFERRED EMBODIMENT

As described above, the present invention enables a JAVA program to access a WINDOWS NT operating system resource under the identity of the person running the JAVA program. Although not meant to be limiting, the invention may be implemented in a Web application server running JAVA-based programs. As will be seen, the invention allows the server to run each JAVA program as a separate thread and to have each thread run as a different WINDOWS NT user. To this end, it is assumed that each JAVA program (or each user thereof) must perform a WINDOWS NT login from a JAVA-based authentication service. The present invention preferably is implemented underneath or "under the covers" as this WINDOWS NT login takes place.

Figure 1:
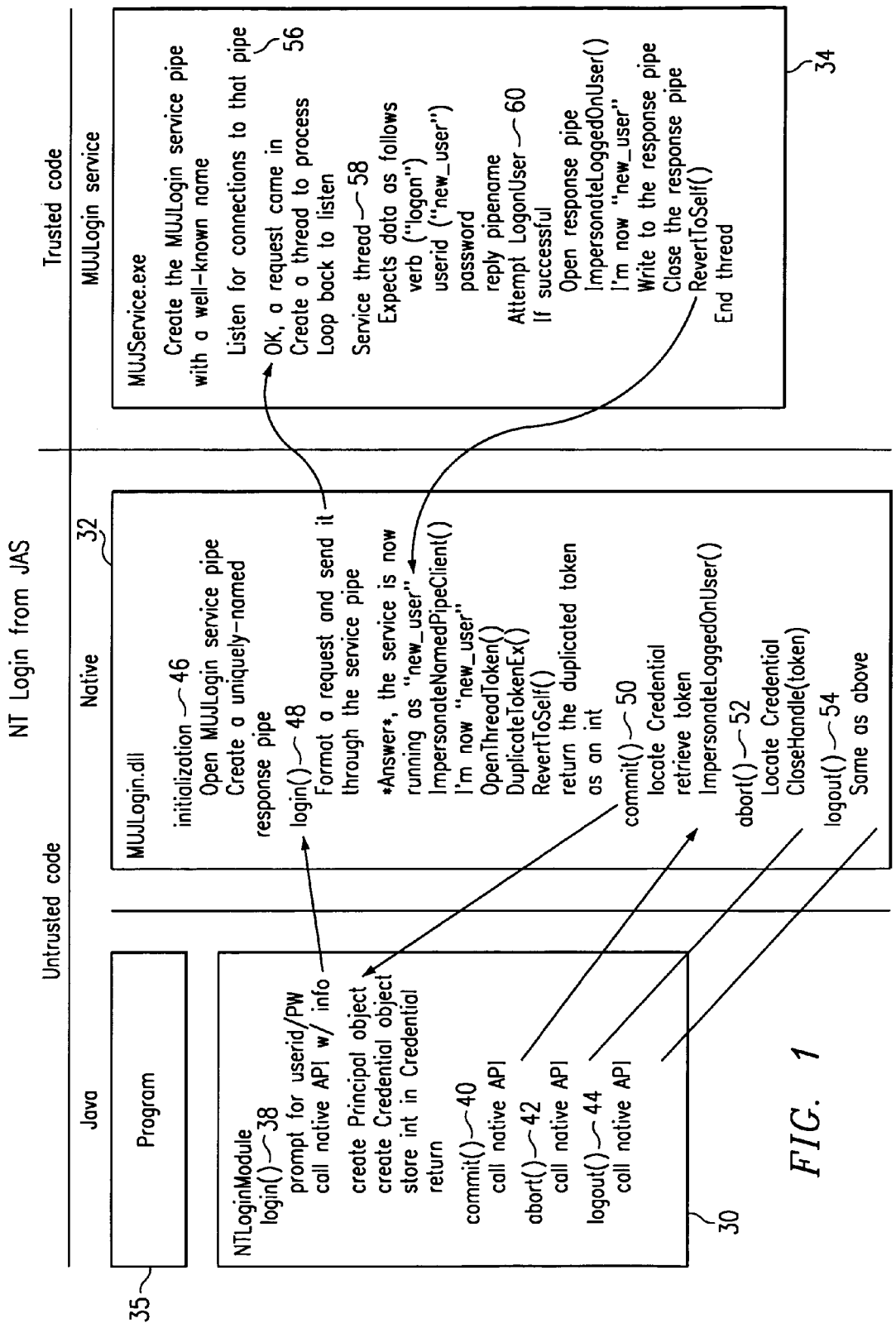
FIG. 1 is a block diagram of the main operating processes of the present invention.

FIG. 1 illustrates the operating environment in which the present invention may be implemented. As will be described, there are three (3) main functional components that are used to enable WINDOWS NT login from a JAVA-based authentication service. In particular, there are two (2) components of untrusted code, namely, components referred to NTLoginModule 30 and MUJLogin.dll 32, and one component of trusted code, i.e. MUJService.exe 34. The NTLoginModule 30 may be written in JAVA. The MUJLogin.dll component 32 may be a native code library. The program requesting access to the native operating system is identified by reference numeral 35. In an illustrative embodiment, the program 35 is written in JAVA and the native operating system is WINDOWS NT. With respect to the operating system kernel and its resources, the JAVA program 35 is untrusted code.

The NTLoginModule 30 preferably includes a set of application programming interfaces (APIs), namely, login( ) API 38, commit( ) API 40, abort( ) API 42, and logout( ) API 44. Collectively, these APIs comprise an authentication framework. In a preferred embodiment, the authentication framework is compliant with the JAVA Authentication and Authorization Services framework, which is a new standard extension on top of the JAVA 1.2 JAVA Development Kit (JDK). Alternatively, the authentication framework is any pluggable authentication mechanism (PAM).

The MUJLogin.dll (multi-user JAVA login module) 32 includes an initialization routine 46, as well as a set of corresponding APIs, namely, the login( ) API 48, commit( ) API 50, abort( ) API 52, and the logout( ) API 54.

The MUJService.exe (multi-user JAVA login service) 34 includes a listener routine 56 and a set of one or more service threads 58. The MUJService.exe 34 component encapsulates the LogonUserAPI 60, which is an API that can only be called by trusted code.

Figure 2:
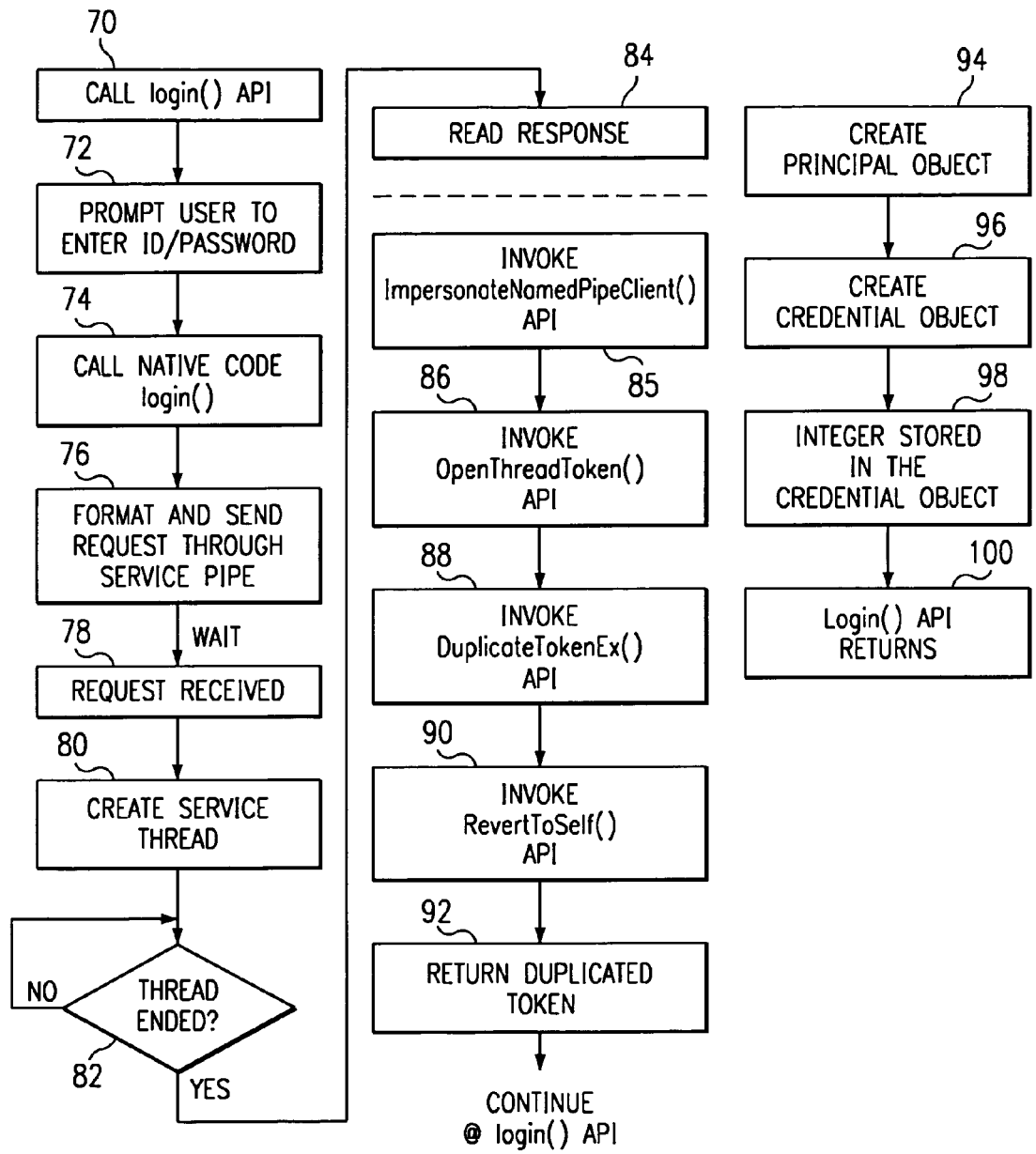
FIG. 2 is a detailed flowchart illustrating the operation of the inventive protocol.

The inventive protocol is now described in the flowchart of FIG. 2. The code involved in these functions is untrusted. It is assumed that the initialization routine 46 of MUJLogin dll 32 is initialized to open a service pipe and to create a uniquely-named response pipe. Also, the MUJService.exe component 34 is initialized to create a service pipe with a particular name that can be discovered. The routine then begins at step 70 with a call to the login( ) API 38 of the NTLoginModule 30. At step 72, the API prompts for the user to enter his or her ID and password. When that information is entered, the login( ) API 38 calls the native code login( ) API 48, passing the user-entered information. This is step 74, which transfers control to the native code component. The login( ) API 48 of MUJLogin.dll 32 then continues at step 76 to format a request and to send the request to MUJService.exe 34 through the service pipe initialized by the initialization routine 46. Control then continues at the MUJService.exe component 34.

In particular, the MUJService.exe component 34, which had been listening on its service pipe, recognizes that a request has been received. This is step 78. At step 80, the MUJService.exe creates a service thread to process the request. This routine then loops back to listen for further requests. A test is then performed at step 82 to determine whether the thread is ended. If not, the routine cycles. If so, at step 84, the answer to the request sent by the login( ) API 48 is sent back to this API. At this point, control returns back to the MUJLogin.dll component 32.

FIG. 3 is a flowchart of the service thread. The code involved in these functions is trusted. The routine begins at step 81 to receive certain data, namely, a verb (logon), a userid (new_user), a password, and a reply pipename. At step 83, the service thread invokes the LogonUser( ) API. If the invocation is successful, the routine continues at step 85 to open the response pipe. At step 87, the service thread invokes an ImpersonateLoggedOnUser( ) API. The user's new identity, new_user, or any other text is then written to the response pipe at step 89, which is then closed at step 91. At step 93, the RevertToSelf( ) API is invoked, which reverts the thread back to its previous identity. The service thread terminates and control then returns back to the MUJLogin.dll 32.

Referring now back to FIG. 2, the service was running as the new_user when it wrote to the response pipe. The MUJLogin.dll API then continues its operation. At step 85, the ImpersonateNamedPipeClient( ) API is invoked. At step 86, the login( ) API 48 invokes an OpenThreadToken( ) API. At step 88, a DuplicateTokenEx( ) API is invoked to duplicate the token. The RevertToSelf( ) API is then invoked at step 90 to enable the thread to revert back to its original identity. At step 92, the login( ) API 48 returns to the JAVA login( ) API 38 the duplicated token. Preferably, the duplicated token is an integer value and, in particular, an index into a process local table in the NT operating system. Control then returns back to the NTLoginModule 30.

In particular, the login( ) API 38 in the NTLoginModule 30 then creates a Principal object at step 94. At step 96, the login( ) API 38 creates a Credential object. At step 98, the integer value (namely, the duplicated token) is stored in the Credential object. The login( ) API 38 then returns at step 100. At this point, the login( ) API 38 has authenticated that the JAVA program can become an NT user and thus access resources in the native NT operating system environment.

The commit( ) API 40 of the NTLoginModule 30 is the functionality that is used to enable the JAVA program to become an NT user. FIG. 4 illustrates the functionality. When the commit( ) API 40 is invoked, the routine continues at step 102 to call the native commit( ) API. Control then passes again to the MUJLogin.dll component 32. At step 104, the native commit( ) API 50 is invoked. This API is then executed. At step 106, the API locates the Credential. At step 108, the API then retrieves the token. The routine then invokes an ImpersonateLoggedOnUser( ) API at step 110, which returns control back to the NTLoginModule 30 to complete the processing.

Thus, according to a preferred embodiment, a JAVA program obtains access to a WINDOWS NT operating system resource in a staged login process. A WINDOWS NT service, which runs under a local system account, has the necessary authority to issue LogonUser calls. This service, however, can be accessed by normal programs through either named pipes or remote procedure calls (RPCs). Accordingly, the present invention as explained above defines a protocol to pass the desired username and password from the JAVA program to the WINDOWS NT service. In operation, the service listens on a well-known named pipe for "logon" requests. The service, upon receiving a call, then issues a LogonUser call to get credentials. To avoid the problem of cross-process transmission of an access token, the protocol passes the name of a uniquely-named named pipe on each logon request. The original caller (in this case, a dll) acts as a named-pipe server and listens for a response from the NT service on this pipe. Once the service has obtained the new access token, it issues an ImpersonateLoggedOnUser( ) call, which associates the new access token with the current service thread. The service has now effectively become that new user. The service then opens the named pipe whose name was transmitted to it and sends back a response (any data will do). The original JAVA program, which has been waiting on a response on its named pipe, then issues an ImpersonateNamedPipeClient( ) call, which allows any named pipe server to run under the authority of its caller to perform its actions. Because the NT service had changed to be the new user, the original JAVA program is now running as the new user.

Then, the original program (running as the new user), issues an OpenThreadToken( ) call on the current thread, followed by a DuplicateTokenEx( ) call to duplicate the access token for the current thread. This operation creates a reference in the underlying kernel structures for the current process that allows the protocol to continue to reference this access token in the future. This token reference is saved, so that it can be handed back to the authentication framework for use as a credential. The current program then performs a RevertToSelf( ) call (which reverts to its previous identity), disconnects and closes the named pipe, and returns the token reference (an integer) back to the authentication framework. When the login chain finishes running, it calls back to the commit( ) API. The integer is then passed for use on the SetThreadToken( ) call. As a result, a change in the NT identity has been effected.

The inventive protocol thus allows the JAVA program to access the WINDOWS NT operating system resource under the identity of the person running the JAVA program. This functionality enables JAVA programs to be successfully integrated with underlying NT operating system services. Thus, one illustrative operating environment of this invention is an application server (e.g., a Web server) running JAVA programs. This architecture is illustrated in FIG. 5.

In this example, a plurality of client machines 10 access the application server 12 via a computer network 15 such as the Internet, an intranet, or some other computer network. A representative client machine is a personal computer that is x86-, PowerPC®- or RISC-based, that includes an operating system such as WINDOWS NT, IBM® OS/20 or Microsoft WINDOWS '95 or higher, and that includes a Web browser, such as Netscape™ Navigator™ 4.0 (or higher), having a JAVA Virtual Machine (JVM) and support for application plug-ins or helper applications. Typically, the server 12 is another personal computer or workstation platform that is Intel®-, PowerPC®- or RISC®-based, and includes an operating system such as WINDOWS NT 4.0. The server runs JAVA programs 16a-16n to provide various services. Each JAVA program is capable of being executed in a separate thread. According to the present invention as previously described, each thread can run as a different NT user. This enables the operator of the server to leverage its investment in JAVA and in the underlying NT security protections.

The inventive protocol, however, is not limited to use on a Web server platform. Rather, the protocol may be implemented within an NT client or, more generally, within any operating environment in which the JAVA program seeks to obtain access to a native NT operating system resource. The inventive technique, however, is not limited to JAVA programs and WINDOWS NT. The technique may be practiced whenever it is desired to enable a program written in code that is not part of a trusted computing base to interact with a security subsystem of a hosting operating system. Further, the technique may be used with any programming architecture or language from which a callout into native code may be made. Thus, the program may be an ActiveX™ program, a program written in Visual Basic™, or the like. Moreover, the given authentication framework utilized is not limited to that framework illustrated above. The authentication framework also may be any pluggable authentication mechanism known in the art (e.g., DCE PAM).

The present invention provides many advantages over the prior art. As noted above, it enables a program written in JAVA to interact with the security subsystem of a hosting operating system, namely, WINDOWS NT, that normally does not allow programs to run under an identity other than the one in which they started. The invention may be implemented without making changes to the base JAVA Virtual Machine (JVM) on which the JAVA programs execute, and the protocol allows a multi-user framework inside of JVM on a very popular commodity operating system.

As has now been described, this invention provides a bridge between the ease of programming with JAVA and the rich security model available from NT. In particular, by allowing JAVA programs to access operating system resources under the identity of the person running the JAVA program, the technique allows each of a set of JAVA programs running on an NT platform to execute in its own thread as a different NT user. As a result, the invention leverages both the investment that corporations have made in JAVA and the investments they have made in setting up proper security protections in NT.

One of the preferred implementations of the various routines described above is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via a computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific application environment, those skilled in the art will recognize that the invention can be practiced, with modification, in other and different hardware and operating system architectures with the spirit and scope of the appended claims. Thus, for example, while the present invention is preferably implemented to allow JAVA programs to access WINDOWS NT resources, the principles of the invention are equally applicable with other known architectures. Once such example is a JAVA servlet environment.

Having thus described our invention, what we claim as new and desire to secure by Letters Patent is set forth in the following claims.

The invention claimed is:

1. A method for enabling a program written in untrusted code to access a native operating system resource, comprising the steps of:
having a trusted login service listen on a named pipe for login requests;
responsive to a login request, wherein the login request contains an identifier for a uniquely-named response pipe, having the trusted login service request a native operating system identifier;
returning to the program via the uniquely-named response pipe the native operating system identifier, wherein the uniquely-named response pipe and the named pipe are not identical;
in an authentication framework, using the native operating system identifier to create a credential object; and
using the credential object to login to the native operating system to enable the program to access the resource.

2. The method as described in claim 1 wherein the native operating system supports named-pipe servers.

3. The method as described in claim 2 wherein the program is written in an interpreted language.

4. The method as described in claim 1 wherein the authentication framework is a pluggable authentication mechanism (PAM) having a set of application programming interfaces (APIs).

5. The method as described in claim 4 wherein the set of application programming interfaces include login, commit, abort and logout APIs.

6. The method as described in claim 4 wherein the authentication framework is compliant with an authentication service of a virtual machine.

7. A computer program product computer storage readable medium for enabling a program written in untrusted code to access a native operating system resource, which when executed comprising the steps of:
listening on a named pipe by a trusted login service for login requests;
responding to a login request for requesting a native operating system identifier by the trusted login service, wherein the login request contains an identifier for a uniquely-named response pipe;
returning to the program via the uniquely-named response pipe the native operating system identifier, wherein the uniquely-named response pipe and the named pipe are not identical;
in an authentication framework, using the native operating system identifier to create a credential object; and
using the credential object to login to the native operating system to enable the program to access the resource.

8. The computer program product as described in claim 7 wherein the program executes in a virtual machine supported by the native operating system and the native operating system supports named-pipe servers.

9. The computer program product as described in claim 7 wherein the program is written in an interpreted language.

10. The computer program product as described in claim 7 wherein the authentication framework is compliant with an authentication service of a virtual machine.

11. An application server, comprising:
a set of programs that are supported by a virtual machine that is supported by a native operating system;
a processor running the native operating system providing support for executing the set of programs; and
means for enabling each program in the set of programs to run in an operating system thread while impersonating a different native operating system user in accordance with a token that was created during a login operation in the native operating system and that was associated with a program while the program was acting as a named-pipe server to listen for a login response on a named pipe that was uniquely created for a login request to obtain the token, wherein the login request contained an identifier for the named pipe.

12. The application server as described in claim 11 wherein the native operating system supports named-pipe servers.

13. The application server as described in claim 11 further including a server application executed by the processor for receiving a request for service from a client machine and initiating execution of a program in the set of programs in a given operating system thread.

14. A method for enabling a program written in untrusted code to access in a trusted manner a resource supported on a computing device executing a native operating system, the method comprising:
listening, by a trusted login service in the native operating system, for login requests on a named request pipe;
generating a login request at the program, wherein the login request contains authentication information and an identifier for a named response pipe, wherein the named request pipe and the named response pipe are not identical;
in response to creating the named response pipe by the program, acting as a named-pipe server on the named response pipe by the program;
in response to receiving the login request on the named request pipe at the trusted login service from the program, performing a login operation with the authentication information by the trusted login service into the native operating system;
in response to performing the login operation, sending a login response on the named response pipe from the trusted login service to the program;
in response to receiving the login response on the named response pipe at the program from the trusted login service, closing the named response pipe such that the named response pipe is uniquely associated with the login request and is not used for additional login requests;
in response to receiving the login response on the named response pipe at the program from the trusted login service, creating a credential object by the program using a token generated during the login operation; and
using the credential object by the program to access the resource within the native operating system.

15. The method as described in claim 14 further comprising:
prior to sending the login response but after performing the login operation, performing a first impersonation operation by the trusted login service, wherein the first impersonation operation is based on the token such that the trusted login service impersonates a security context of a user associated with the authentication information; and
prior to closing the named response pipe but after receiving the login response, performing a second impersonation operation by the program, wherein the second impersonation operation is based on the trusted login service acting as a named-pipe client on the named response pipe and the program acting as the named-pipe server on the named response pipe such that the program impersonates a security context of the login response as a most recent message read from the named response pipe.

16. The method as described in claim 15 further comprising:
- after sending the login response, performing a first revert operation by the trusted login service to terminate its previous impersonation; and
- after performing a token duplication operation by the program, performing a second revert operation by the program to terminate its previous impersonation.

17. The method as described in claim 15 further comprising:
- performing a token duplication operation by the program, wherein the token duplication operation associates the token with a thread that initiated a login in order to obtain access to the resource.

18. The method as described in claim 17 further comprising:
- after performing the token duplication operation, performing a third impersonation operation by the program, wherein the third impersonation operation is based on the credential object such that a calling thread impersonates a security context of a user associated with the authentication information.

* * * * *